(12) United States Patent
Righi et al.

(10) Patent No.: US 10,540,151 B1
(45) Date of Patent: Jan. 21, 2020

(54) GRAPHICAL CUSTOMIZATION OF A FIRMWARE-PROVIDED USER INTERFACE (UI)

(71) Applicant: American Megatrends, Inc., Norcross, GA (US)

(72) Inventors: Stefano Righi, Lawrenceville, GA (US); Feng Li, Sugar Hill, GA (US); Madhan B. Santharam, Duluth, GA (US); Presanna Raman, Suwanee, GA (US); Howelle Blaine Summers, Decatur, GA (US)

(73) Assignee: American Medatrends International, LLC, Norcross, GA (US)

( * ) Notice: Subject to any disclaimer, the term of this patent is extended or adjusted under 35 U.S.C. 154(b) by 43 days.

(21) Appl. No.: 15/663,500

(22) Filed: Jul. 28, 2017

(51) Int. Cl.
*G06F 3/14* (2006.01)
*G06F 8/38* (2018.01)
*G06F 8/34* (2018.01)
*G06F 9/4401* (2018.01)

(52) U.S. Cl.
CPC .................. *G06F 8/38* (2013.01); *G06F 8/34* (2013.01); *G06F 9/4401* (2013.01)

(58) Field of Classification Search
CPC ....................................................... G06F 3/14
USPC ............ 715/762; 717/172; 726/7; 713/2; 1/1
See application file for complete search history.

(56) References Cited

U.S. PATENT DOCUMENTS

| | | | | |
|---|---|---|---|---|
| 2009/0031295 A1* | 1/2009 | Zhao | ................... | G06F 9/44505 717/172 |
| 2015/0186161 A1* | 7/2015 | Cho | ................... | G06F 9/44505 713/2 |
| 2015/0326513 A1* | 11/2015 | Chiu | ....................... | H04L 51/22 726/7 |
| 2018/0121339 A1* | 5/2018 | Mayers | ............... | G06F 11/3688 |

OTHER PUBLICATIONS

Author Unknown, Draft EDK II VFR Programming Language Specification, Apr. 3, 2017, https://edk2-docs.gitbooks.io/edk-ii-vfr-specification/content/v/release/1.91/#edk-ii-vfr-programming-language-specification (81 pages).

* cited by examiner

*Primary Examiner* — Ruay Ho
(74) *Attorney, Agent, or Firm* — Newport IP, LLC Shigeta | Hope

(57) ABSTRACT

A firmware provides a setup browser that generates a setup menu. An internal forms representation of setup data for rendering the setup menu is converted to markup language (ML) setup data. The ML setup data is provided to an application that provides a GUI for defining a modified setup UI for the firmware. The application provides a graphical, drag-and-drop, WYSIWYG, UI through which a user can edit existing forms and controls, create new forms and controls, and specify default values and other properties. When a user modifies the setup menu using the application, customized ML setup data is generated that defines the modified setup UI. The customized ML setup data is used to create setup data that is stored in a firmware device for use by the setup browser with the internal format representation of setup data to render the modified setup UI.

20 Claims, 7 Drawing Sheets

US 10,540,151 B1

GRAPHICAL CUSTOMIZATION OF A FIRMWARE-PROVIDED USER INTERFACE (UI)

BACKGROUND

In many computing systems, low-level instruction code, or firmware, is used to configure hardware components in preparation for booting an operating system. For example, and without limitation, some computing systems utilize firmware that is compliant with a specification released by the Unified Extensible Firmware Interface ("UEFI") Forum (the "UEFI Specification"). Such a firmware might be referred to herein as a UEFI Specification-compliant firmware, a UEFI-compliant firmware, or a UEFI firmware. Other types of firmware implementations perform similar functions.

Many types of firmware provide user interfaces ("UIs") through which users can configure various aspects of the operation of the computer upon which the firmware executes. For example, and without limitation, many types of firmware provide a setup menu that can be accessed when a computer first starts up. Through the setup menu, a user can specify values for various parameters that are utilized to control aspects of the operation of the computer. Some common parameters that can be specified include, but are not limited to, boot order, firmware setup defaults, a firmware password, the current date and time, hard drive settings, processor and memory settings, and others.

In some scenarios, firmware developers enable original equipment manufacturers ("OEMs") that manufacture motherboards that use the firmware, to customize the setup menu to their preference. For example, and without limitation, an OEM might choose to hide menu items or pages in a setup menu for setting certain parameters for a particular hardware configuration. In order to enable customization of the setup menu in this manner, a firmware developer can provide an OEM with a file containing data that defines the setup menu and the default values for modifiable parameters. The OEM can then edit the contents of the file in order to customize the setup menu according to their preference.

Customization of such a file, however, requires detailed knowledge of the language grammar utilized in the file to define the contents of the setup menu. Moreover, this type of customization requires the OEM to manually manipulate the contents of the file using a text editor, or another type of editor, which can be time-consuming and error-prone. Additionally, if the firmware developer issues an updated file, the OEM will have to perform the same configuration changes once again on an updated file. These considerations can result in an inefficient firmware development process, errors in the setup menu, non-optimal values for setup parameters and, ultimately, inefficient utilization of computing resources and poor performance.

It is with respect to these and other considerations that the disclosure made herein is presented.

DETAILED DESCRIPTION

Figure 1A:
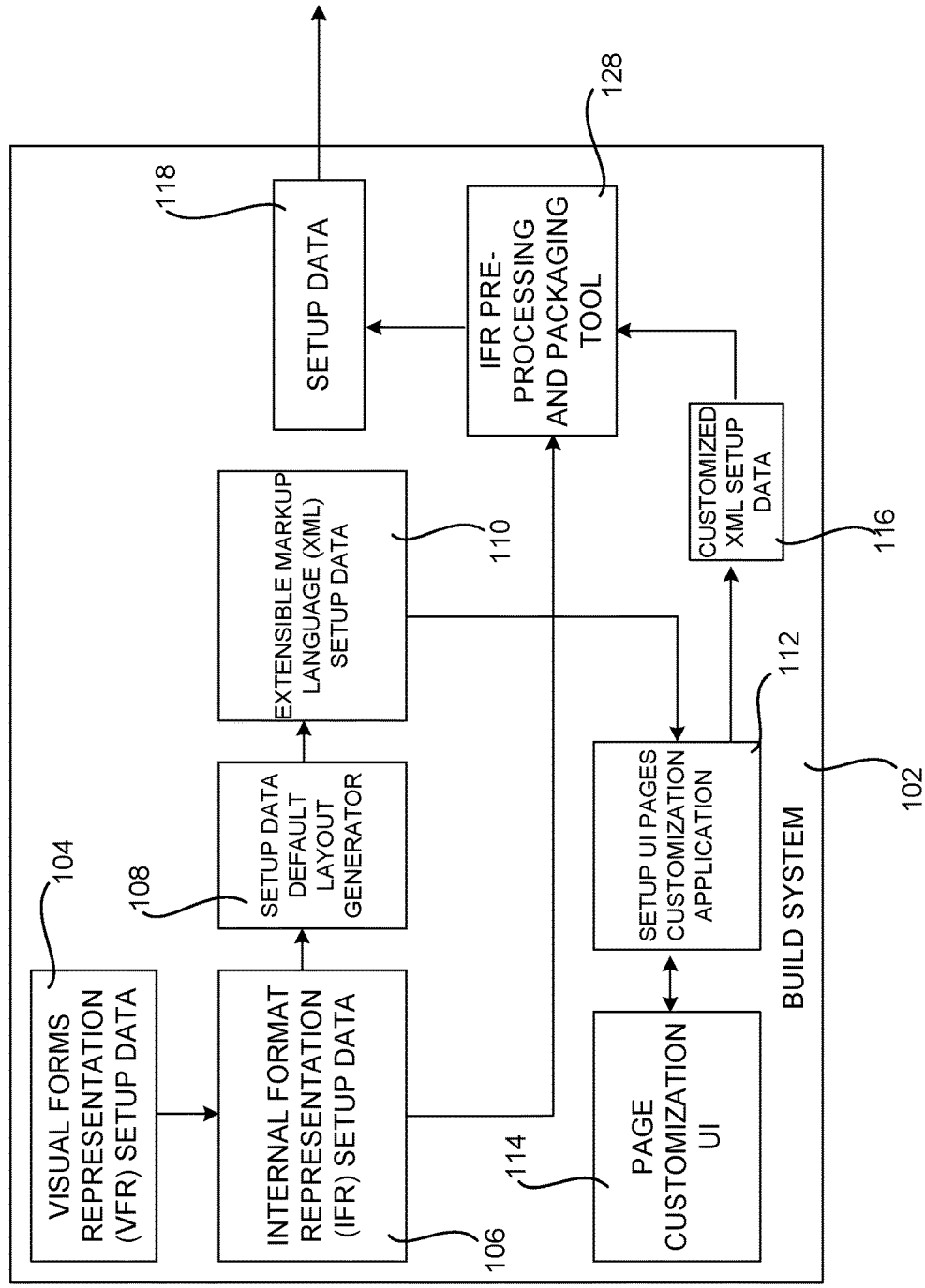
FIG. 1A is a software architecture diagram that illustrates aspects of one mechanism disclosed herein for graphical customization of a firmware-provided setup menu, according to one embodiment.

Technologies for graphical customization of a firmware-provided UI, such as a setup menu, are disclosed herein. Through an implementation of the disclosed technologies, customization of a firmware-provided UI, such as a setup menu, can be performed without detailed knowledge of the language grammar utilized to define the UI. Moreover, a firmware-provided UI can be customized utilizing a graphical UI, rather than through manual editing. Additionally, previously made customizations to a firmware-provided UI do not need to be repeated when a firmware developer issues updates to the firmware.

Through an implementation of the disclosed technologies, the firmware development process may be performed more efficiently, errors in firmware-provided UIs, such as a setup menu, can be reduced, non-optimal values for setup parameters can be avoided and, as a result, computing resources can be utilized more efficiently. Other technical benefits can also be realized through an implementation of the disclosed technologies.

In one particular implementation, a firmware, such as a UEFI-compliant firmware, provides a setup menu that can be accessed through the firmware, typically when the computer first starts up. Through the setup menu, a user can specify values for various parameters that are utilized to control aspects of the operation of the computer. As mentioned above, some common parameters that can be specified include, but are not limited to, boot order, firmware setup defaults, a firmware password, the current date and time, hard drive settings, processor and memory settings, and others.

The firmware also provides an application or module, which might be referred to herein as a "setup browser," that renders the setup menu at run time. The setup browser utilizes binary setup data that defines the various pages (which might also be referred to herein as "forms") and UI controls on the pages that make up the setup menu. The setup data is stored in the firmware for use by the firmware to render the setup menu at run time. The setup browser can also utilize other types of data, such as internal forms representation ("IFR") setup data, in order to render the setup menu.

In order to enable customization of the setup data, the setup menu is defined using visual forms representation ("VFR") in one embodiment. The VFR setup data is then compiled to create the IFR setup data. The IFR setup data also defines the forms and controls contained in the setup menu provided by the firmware.

The IFR Setup data can define a default set of setup forms recommended by a firmware developer. An OEM might desire to change the default UI, such as for instance to reorganize or hide pages or controls. As discussed in greater detail below, the technologies disclosed herein provide a mechanism for the OEM to perform such customization without modifying the default VFR setup data. In this way, when there is an update to the firmware, amount of merging to update a firmware project is minimal because firmware developer and the OEM work on different files. This can provide various technical benefits, some of which were described above.

The IFR setup data is converted to extensible markup language ("XML") (or another type of markup language ("ML")) setup data. The XML setup data (and the customized XML setup data described below) can include XML in a pre-defined schema that identifies a platform-specific identifier, the one or more forms of the setup menu, the controls to be placed on the forms, language-specific strings for use in the setup menu, variables defining attributes of the forms and controls that make up the setup menu and, potentially, other types of data.

The XML setup data is provided to an application, which might be referred to herein as a "setup UI pages customization application" or just an "application," that provides a graphical UI ("GUI") for defining a modified setup UI for the firmware. The setup UI pages customization application provides a graphical, drag-and-drop, what you see is what you get ("WYSIWYG"), UI through which a user can graphically edit existing forms and controls, create new forms and controls, and specify default values and other properties for a setup menu. The setup UI pages customization application can also provide other types of functionality including, but not limited to, validating the UI controls in the setup menu based upon an offset, a length of the UI controls, and hash values associated with the UI controls.

When a user modifies the setup menu using the setup UI pages customization application, the setup UI pages customization application generates customized XML setup data that defines the modified setup UI. The customized XML setup data is then used to create the binary setup data that is consumed by the setup browser executing in the firmware to render the modified setup UI. The setup data can then be stored in a firmware device for use by the setup browser executing in the firmware to render the modified setup UI at run time.

It is to be appreciated that while the subject matter disclosed herein is primarily presented in the context of a setup menu provided by a firmware, the technologies described herein can be utilized similarly to customize other types of UIs provided by a firmware. It is also to be appreciated that the above-described subject matter can be implemented as a computer-controlled system or apparatus, a computer process, a computing system, or as an article of manufacture such as a non-transitory computer-readable storage medium. These and various other features will be apparent from a reading of the following Detailed Description and a review of the associated drawings.

This brief summary of the disclosed subject matter provided above is intended to introduce a selection of concepts in a simplified form that are further described below in the Detailed Description. This summary is not intended to identify key features or essential features of the claimed subject matter, nor is it intended that this summary be used to limit the scope of the claimed subject matter. Furthermore, the claimed subject matter is not limited to implementations that solve any or all disadvantages noted in any part of this disclosure.

In the following detailed description, references are made to the accompanying drawings that form a part hereof, and in which are shown by way of illustration specific configurations or examples. Referring now to the drawings, in which like numerals represent like elements throughout the several FIGS., aspects of an exemplary operating environment and the various technologies provided herein will be described.

While the configurations presented herein are described in the general context of program modules that execute in conjunction with the execution of a computer firmware, those skilled in the art will recognize that various configurations can also be implemented in combination with other program modules. Generally, program modules include routines, programs, components, data structures, and other types of structures that perform particular tasks or implement particular abstract data types. Moreover, those skilled in the art will appreciate that the invention can be practiced with other computer system configurations, including handheld devices, multiprocessor systems, microprocessor-based or programmable consumer electronics, minicomputers, mainframe computers, embedded systems, and the like. Configurations presented herein can also be practiced in distributed computing environments where tasks are performed by remote processing devices that are linked through a communications network. In a distributed computing environment, program modules can be located in both local and remote memory storage devices.

Figure 4:
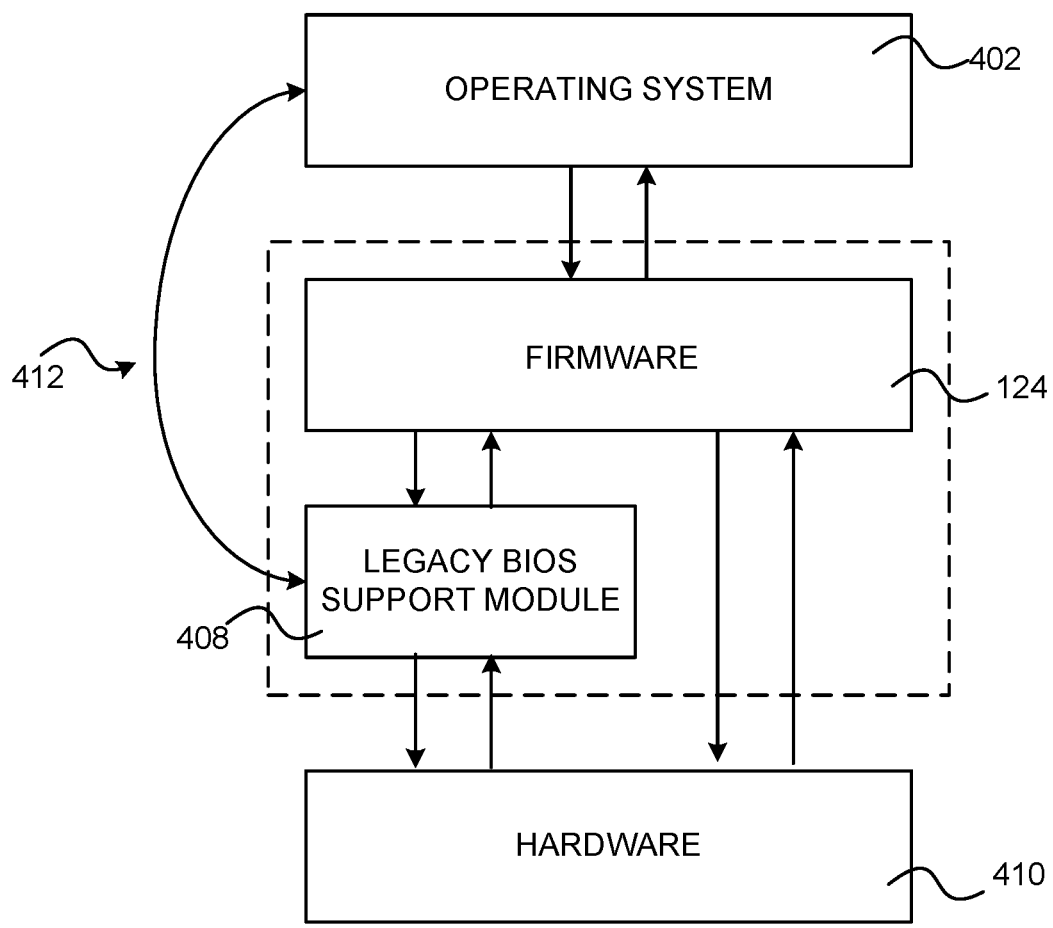
FIG. 4 is a software architecture diagram illustrating aspects of an interface between a UEFI Specification-compliant firmware and an operating system according to one or more embodiments presented herein.
Figure 5:
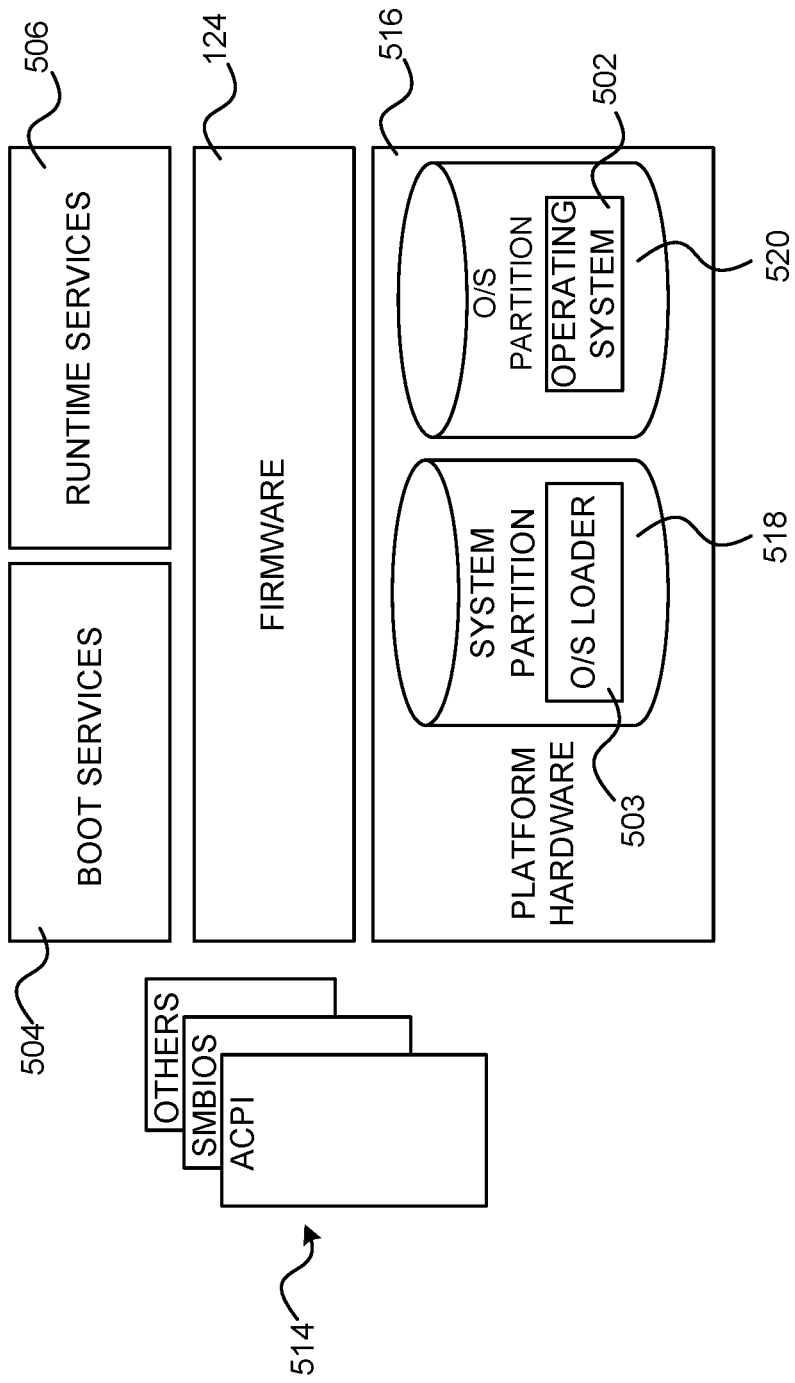
FIG. 5 is a software architecture diagram illustrating an architecture for a UEFI Specification-compliant firmware that provides an operating environment for one or more embodiments presented herein.

FIG. 1A is a software architecture diagram that illustrates aspects of one mechanism disclosed herein for graphical customization of a setup menu provided by a firmware, such as a UEFI Specification—compliant firmware. Such a firmware, which is described in greater detail below with regard to FIGS. 4 and 5, provides a set of software routines that configure a computing system prior to boot time, boot an operating system on the computing system, and provide a limited set of run time services. As mentioned above, such a firmware might be referred to herein as a UEFI Specification-compliant firmware, a UEFI-compliant firmware, a UEFI firmware, or simply a firmware. The embodiments disclosed herein can also be utilized with other types of firmware.

As described briefly above, a firmware 124 (shown in FIG. 1C) provides a setup menu 126 (also shown in FIG. 1C) that can be accessed through the firmware 124, typically when a computing system 120 (also shown in FIG. 1C) executing the firmware 124 is first powered on. Through the setup menu 126, a user can specify values for various parameters that are utilized to control aspects of the operation of the computing system 120. As mentioned above, some common parameters that can be specified include, but are not limited to, boot order, firmware setup defaults, a firmware password, the current date and time, hard drive settings, processor and memory settings, and others.

The firmware 124 also provides a module or application (also shown in FIG. 1C), which might be referred to herein as the setup browser 125, that renders the setup menu 126 at run time (i.e. execution time of the firmware 124). The setup browser 125 utilizes binary setup data 118 and IFR setup data 106 (both shown in FIG. 1C) that defines the various pages (which might also be referred to herein as "forms") and UI controls on the pages that make up the setup menu 126. The setup data 118 is stored in the firmware 124 and utilized by the setup browser 125 at run time to enable reorganization of IFR objects and, ultimately, to generate the setup menu 126.

As shown in FIG. 1A, a build system 102 is provided in one embodiment that enables a user to customize the setup menu 126 using a graphical drag-and-drop WYSIWYG GUI (e.g. the page customization UI 114). In order to provide this functionality, the default content of the setup menu 126 is defined by the developer of the firmware 124 using Visual Forms Representation ("VFR") in one embodiment. Using the VFR syntax, a compiler can take a text file containing VFR as an input, and output Internal Forms Representation ("IFR"). There are various methods to define the VFR language, some of which are described in the VFR Programming Language Specification, which is available from TIANOCORE (https://edk2-docs.gitbooks.io/edk-iivfr-specification/content/v/release/1.91/), and which is expressly incorporated herein by reference in its entirety. As discussed in greater detail below, the default content can be customized by an OEM, such as a motherboard manufacturer.

The VFR setup data 104 is then compiled to create an IFR of the setup data 118 for generating the setup menu 126. The IFR setup data 106 defines the forms and UI controls contained in the setup menu 126 provided by the firmware 124. In some embodiments, the IFR setup data 106 can be consumed by the setup browser 125 to render the setup menu 126. Additional details regarding IFR can be found in Chapter 31.2.5 (Forms) of the UEFI Specification (2.6 Human Interface Infrastructure Overview).

In one embodiment, a software setup data default layout generator 108 then converts the IFR setup data 106 to extensible markup language ("XML") (or another type of ML) setup data 110. The XML setup data 110 (and the customized XML setup data 116 described below) can include XML in a pre-defined schema that identifies a platform-specific identifier (i.e. for the computing system 120), the one or more forms of the setup menu 126, the UI controls to be placed on the forms and their locations, unique identifiers for the controls (e.g. an MD5 hash value), the control type, control options, default values, and configuration flags, language-specific strings for use in the setup menu 126, variables defining attributes of the forms and controls that make up the setup menu 126 and, potentially, other types of data. These elements, other than rendering information, are defined in the IFR setup data 106. The XML setup data enables customization of the setup menu without changing the original VFR setup data 104. The XML setup data 110 can also provide rendering information that is not defined by the VFR setup data 104.

Table 1, below, shows aspects of an illustrative format for the XML setup data 110 (and the customized XML setup data 116 described below). Other markup languages and schemas can be used in other configurations.

TABLE 1

```
<SetupData attribute = "value"...>
  <Platform attribute = "value" ...>
    <Pages>
      <Page attribute = "value"...>
        <Control Type = "Submenu" Offset="..." Length = "..."
        MD5 = "..." .../>
        <Control Type = "Text" Offset="..." Length = "..."
        MD5 = "..." .../>
        ...
      </Page>
```

TABLE 1-continued

```
        ....additional page tags
      </Pages>
      <Stringdata.../>
    </Platform>
</SetupData>
```

The setup data default layout generator 108 provides the XML setup data 110 to an application 112, which might be referred to herein as the "setup UI pages customization application 112," that provides a GUI for customizing the setup menu 126 defined by the XML setup data 110. The setup UI pages customization application 112 provides a graphical, drag-and-drop, WYSIWYG, UI through which a user can edit existing forms and controls in the setup menu 126, create new forms and controls in the setup menu 126, and specify default values and other properties for the setup menu 126 and its various components. The setup UI pages customization application 112 can also provide other types of functionality including, but not limited to, validating the UI controls in the setup menu based upon an offset, a length of the UI controls, and hash values associated with the UI controls. Additional details regarding the validation process are provided below.

When a user modifies the setup menu 126 using the setup UI pages customization application 112, the setup UI pages customization application 112 generates customized XML setup data 116 that defines a modified version of the default setup menu 126 defined by the IFR setup data 106 and the XML setup data 110. A software IFR pre-processing and packaging tool 128 then uses the customized XML setup data 116 to create binary setup data 118 for consumption by the setup browser 125 executing in the firmware 124 to render the modified setup menu defined using the application 112. The setup data 118 can then be stored in a firmware device (e.g. a flash memory device) for use by the setup browser 125 executing in the firmware 124 to render the modified setup menu at run time. Additional details regarding the run time process are provided below with regard to FIG. 1C.

Figure 1B:
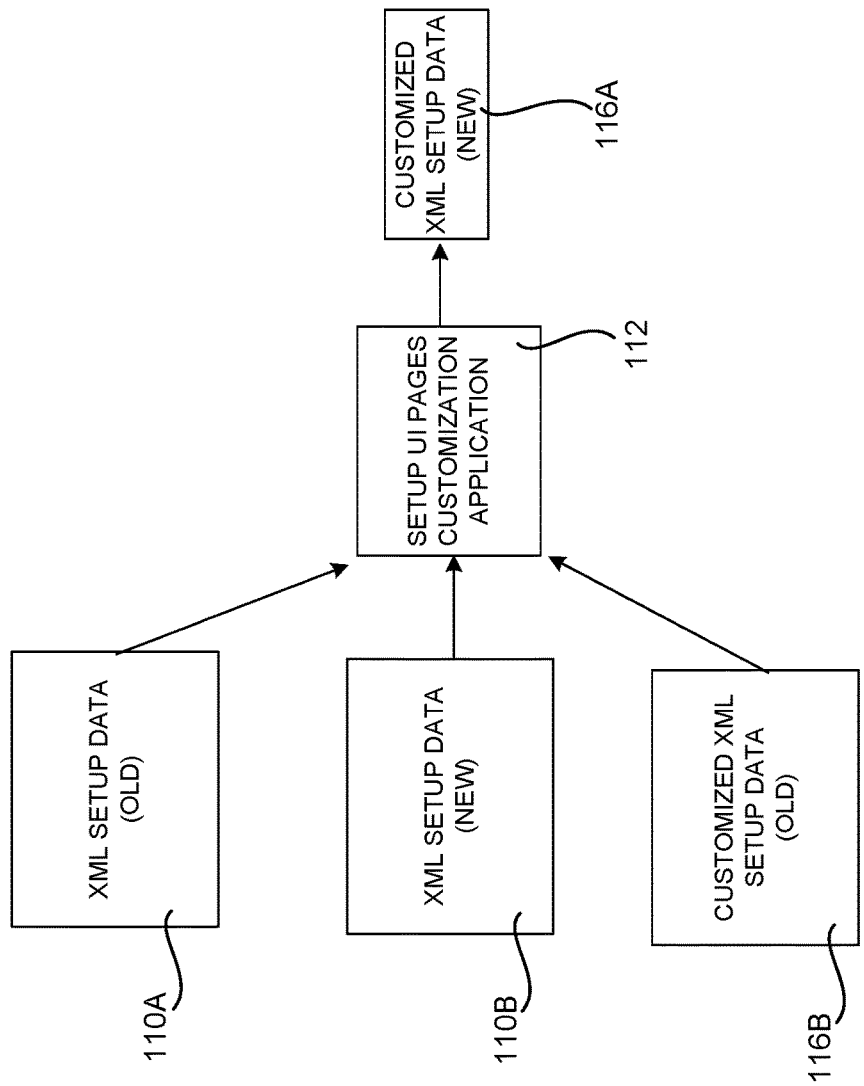
FIG. 1B is a software architecture diagram that illustrates aspects of one mechanism disclosed herein for adapting customized markup language setup data when updates to an internal forms representation ("IFR") of the setup data are received, according to one embodiment.

FIG. 1B is a software architecture diagram that illustrates aspects of one mechanism disclosed herein for adapting customized XML setup data 116 when updates to the VFR setup data 104 and the IFR setup data 106 are made. The mechanism shown in FIG. 1B is separate from the process shown in FIG. 1A. The mechanism shown in FIG. 1B enables customizations made to the VFR setup data 104 (e.g. such as by an OEM) to be preserved when a firmware update is issued by the firmware developer that includes new VFR setup data 104. The mechanism shown in FIG. 1B enables an OEM to update the customized XML setup data in a manner that retains their customizations while at the same time incorporating the updates provided by the firmware developer.

In order to provide this functionality, the setup UI pages customization application 112 performs a three-way comparison between old XML setup data 110A, new XML setup data 110B, and old customized XML setup data 116B. The old XML setup data 110A is the XML setup data 110 from a previous version of the VFR setup data 104. The new XML setup data 110B is the XML setup data 110 for modified VFR setup data 104 (e.g. new VFR setup data issued by the firmware developer). The old customized XML setup data 116B is the customized XML setup data 116B generated using the old XML setup data 110A and the customizations defined by the OEM.

Based upon the three-way comparison, the setup UI pages customization application 112 can generate new customized XML setup data 116A. The new customized XML setup data 116A includes the changes made in the new XML setup data 110B and the customizations present in the old customized XML setup data 116B. The new customized XML setup data 116A can then be used in the manner described above with regard to FIG. 1A.

The application 112 can also highlight changes to the old XML setup data 110 in the UI 114 in the event that conflicts are detected between the old XML setup data 110A, new XML setup data 110B, and old customized XML setup data 116B. In this manner, a user can quickly identify conflicts and resolve them. The setup UI pages customization application 112 can also attempt to automatically resolve conflicts in some embodiments.

Figure 1C:
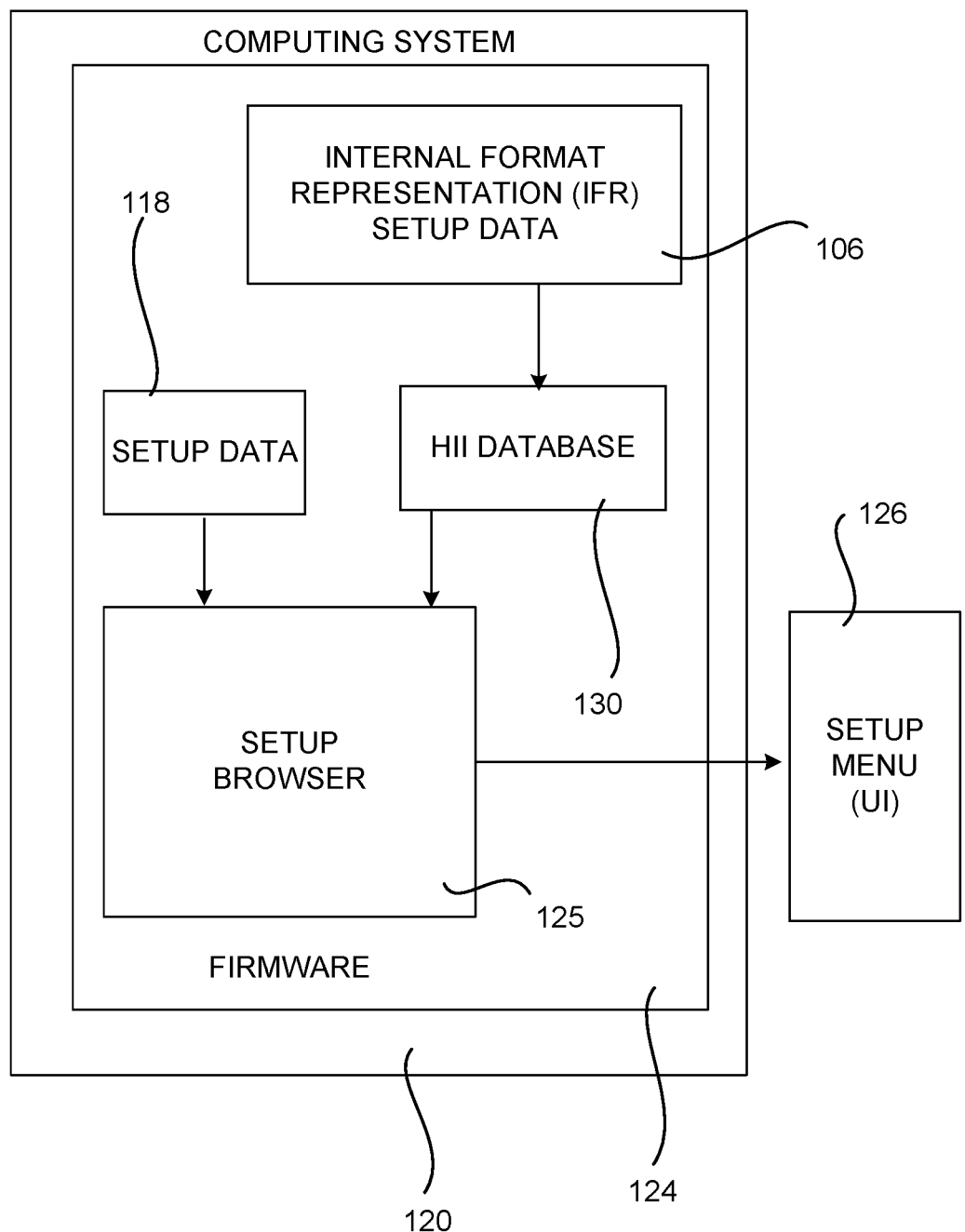
FIG. 1C is a software architecture diagram that illustrates aspects of a runtime process for generating a setup menu using setup data and, potentially, IFR setup data, according to one embodiment.

FIG. 1C is a software architecture diagram that illustrates aspects of a runtime process for generating the setup menu 126 using the setup data 118 and, potentially, the IFR setup data 106, according to one embodiment. As shown in FIG. 1C, a Human Interface Infrastructure ("HII") database 130 is generated at runtime in some embodiments.

The HII database 130 can includes the IFR setup data 106. The HII database 130 can be created by posting HII packs for use by other firmware drivers and applications. The IFR setup data 106 is one type of HII pack. The setup browser 125 utilizes the setup data 118 and the IFR setup data 106 to render the setup menu 126 in one embodiment.

Figure 2:
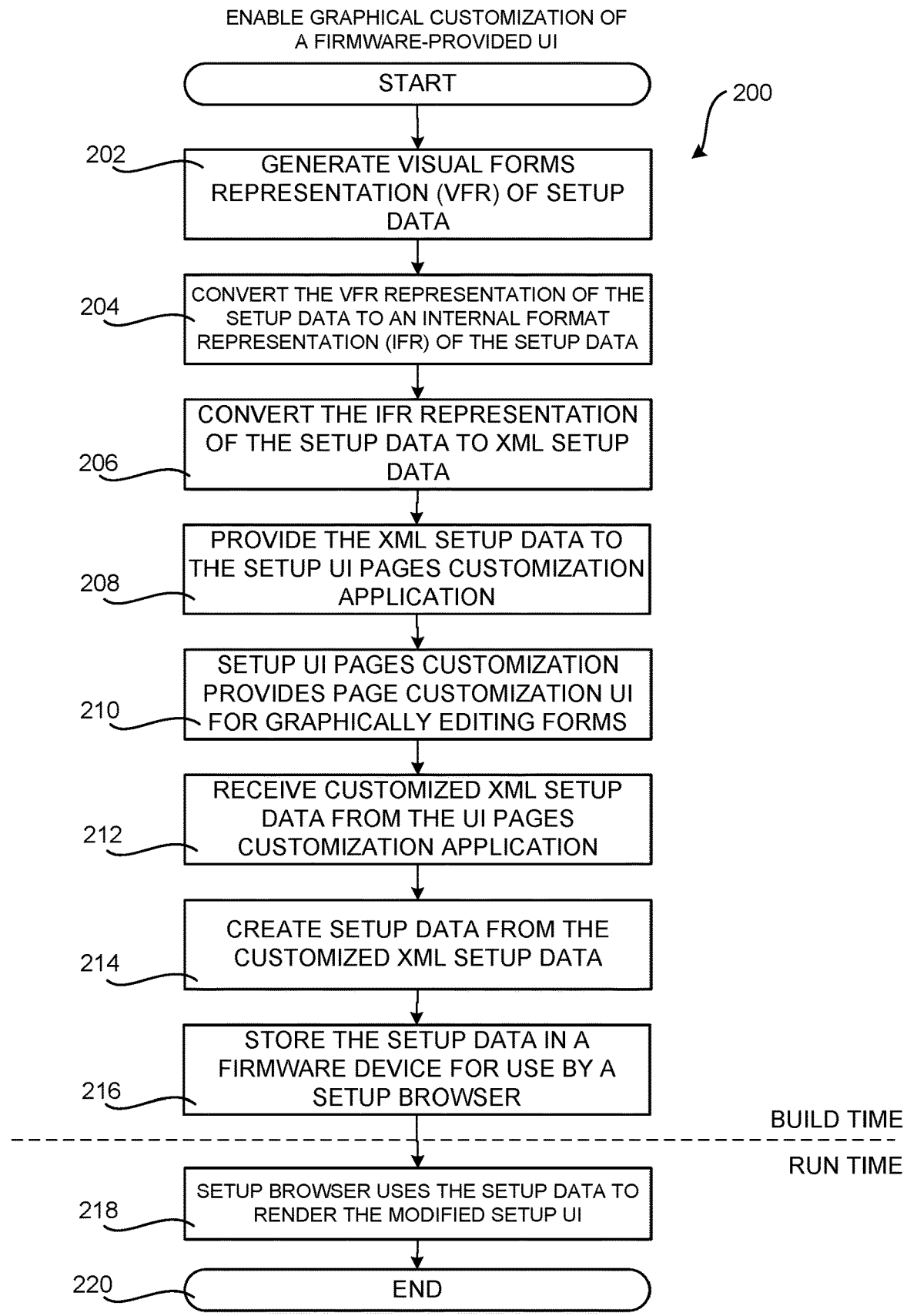
FIG. 2 is a flow diagram that illustrates aspects of the mechanism shown in FIGS. 1A-1C for graphical customization of a firmware-provided setup menu, according to one embodiment.

FIG. 2 is a flow diagram showing a routine 200 that illustrates aspects of the mechanism shown in FIGS. 1A-1C for graphical customization of a firmware-provided UI, such as the setup menu 126, according to one embodiment. It should be appreciated that the logical operations described herein with regard to FIG. 2 and the other FIGS. are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 200 begins at operation 202, where the VFR setup data 104 is created. The routine 200 then proceeds from operation 202 to operation 204, where the VFR setup data 104 is then compiled to create the IFR setup data 106. The routine 200 then proceeds from operation 202 to operation 206.

At operation 206, the setup data default layout generator 108 converts the IFR setup data 106 to XML setup data 110. The routine 200 then proceeds to operation 208, where the setup data default layout generator 108 provides the XML setup data 110 to the setup UI pages customization application 112. The routine 200 then proceeds from operation 208 to operation 210.

At operation 210, the setup UI pages customization application 112 provides the GUI (i.e. the page customization UI 114) for customizing the setup menu 126 defined by the XML setup data 110. Once a user has completed modification of the setup menu 126 using the setup UI pages customization application 112, the routine 200 proceeds to operation 212.

At operation 212, the setup UI pages customization application 112 generates customized XML setup data 116 that defines a modified setup menu, and provides the customized XML setup data 116 to the setup data default layout generator 108. The routine 200 then proceeds from operation 212 to operation 214, where the setup data default layout generator 108 uses the customized XML setup data 116 to create setup data 118 for use by the setup browser 125 executing in the firmware 124 to render the modified setup menu. The setup data 118 is stored in a firmware device (e.g. a flash memory device) for use by the setup browser 125 executing in the firmware 124 to render the modified setup menu at run time at operation 216.

As discussed above, the setup browser 125 can also use the original IFR setup data 106 retrieved from the HII database 130, where the firmware 124 has published the IFR setup data 106 for a boot. The HII database 130 is created by posting a number of HII packs for usage by other firmware drivers and applications. The IFR setup data is one type of HII pack.

At operation 218, the setup browser 125 is executed (i.e. run time) and uses the setup data 118 to render the setup menu 126 as shown in FIG. 1C and described above. The routine 200 then proceeds from operation 216 to operation 218, where it ends.

Figure 3:
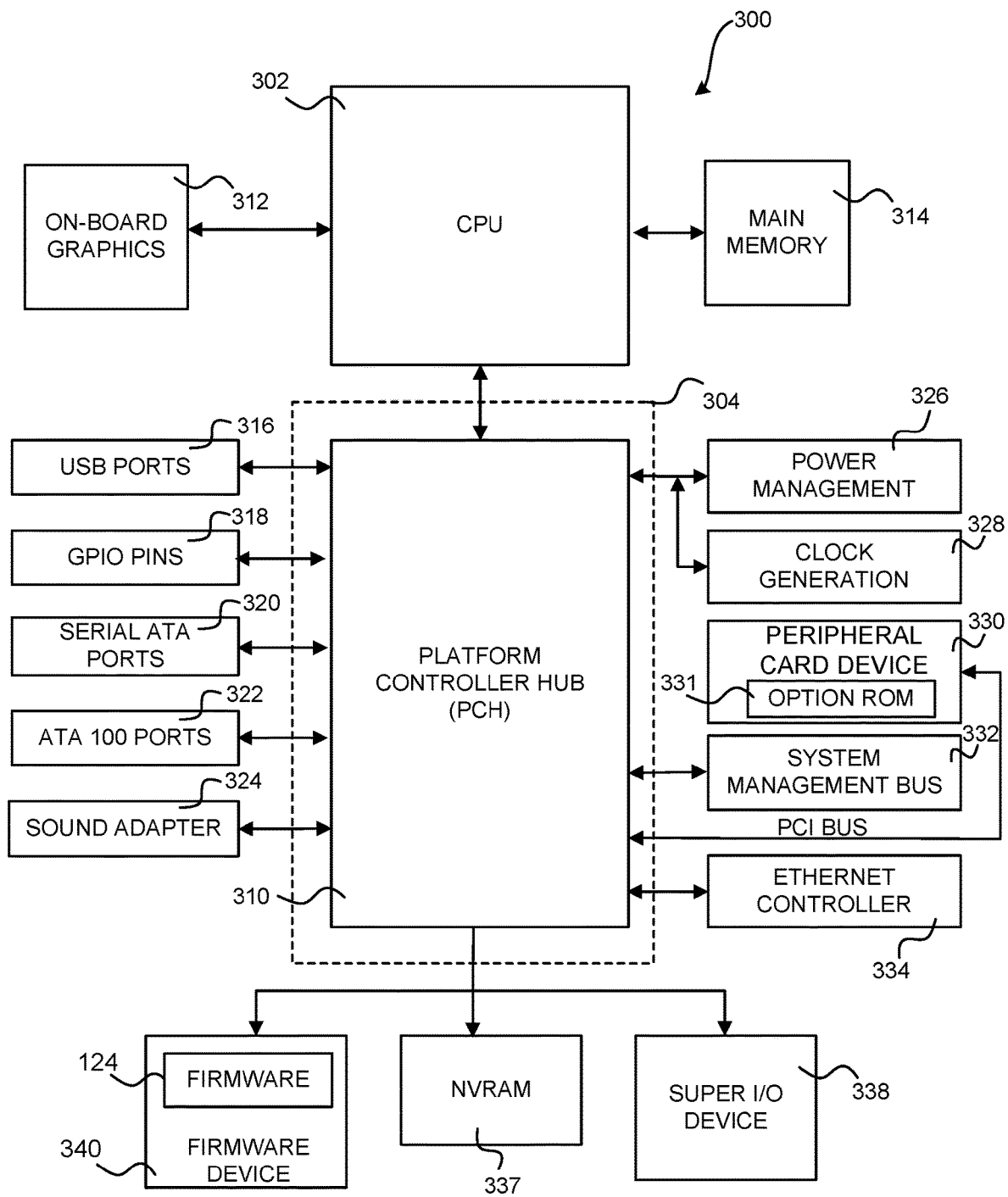
FIG. 3 is a computer architecture diagram that illustrates various components of a computing device that can provide the functionality disclosed herein.

Referring now to FIG. 3, an illustrative computer architecture for a computer capable of implementing the various technologies discussed herein will be described. In particular, the computer architecture shown in FIG. 3 can be utilized to implement the computing system 120 and/or computing systems utilized by the build system 102 to execute the setup data default layout generator 108 and the setup UI pages customization application 112. It should be appreciated that although the configurations described herein are discussed primarily in the context of a conventional desktop, laptop, or server computer, the configurations can be utilized with virtually any type of computing device that utilizes a firmware, such as a UEFI-compliant firmware, to control aspects of its operation.

In order to provide the functionality described herein, the computer 300 can include a baseboard, or motherboard (not shown in FIG. 3). The motherboard can be a printed circuit board to which some or all of the components shown in FIG. 3 can be connected by way of a system bus or other electrical communication path.

In one illustrative configuration, the motherboard includes one or more central processing units ("CPU") 302 configured to operate in conjunction with a chipset 304. The CPU 302 can be a central processor that performs arithmetic and logical operations necessary for the operation of the computer. For example, the CPU 302 might be a CPU available from INTEL CORPORATION, AMD CORPORATION, or a CPU based upon the ARM architecture from ARM HOLDINGS. Other types of CPUs might also be utilized. In some configurations, the CPU 302 includes an interface to a random access memory ("RAM") used as the main memory 314 in the computer 300 and, possibly, to an on-board graphics adapter 312.

In one implementation, particularly where CPUs available from INTEL CORPORATION or AMD CORPORATION are utilized, the chipset 304 includes a platform controller hub ("PCH") 310. In implementations where a CPU based upon the ARM architecture is utilized, a system-on-chip ("SOC") can be utilized, which can include some or all of the various components described below.

The PCH 310 provides an interface between the CPU 302 and the remainder of the computer 300. The PCH 310 can also provide functionality for enabling networking communication through an Ethernet controller 334, or another type of network interface. The Ethernet controller 334 is capable of connecting the computer 300 to another computer via a network. Connections that can be made by the Ethernet controller 334 can include local area network ("LAN") or wide area network ("WAN") connections. LAN and WAN networking environments are commonplace in offices, enterprise-wide computer networks, intranets, and the Internet.

The PCH 310 can also include components for controlling many of the input/output functions of the computer 300. In particular, the PCH 310 can provide one or more universal serial bus ("USB") ports 316, a sound adapter 324, the Ethernet controller 334, and one or more general purpose input/output ("GPIO") pins 318. The PCH 304 can also provide a system management bus 332 for use in managing the various components of the computer 300. Power management circuitry 326 and clock generation circuitry 328 can also be utilized during the operation of the PCH 310.

The PCH 310 can also provide a bus for interfacing peripheral card devices or add-in cards 330, such as a SCSI host bus adapter. In one configuration, the bus comprises a peripheral component interconnect ("PCI") bus. It should be appreciated that other types of add-in cards compliant with other types of bus standards might also be utilized. The add-in card 330 might also include an option ROM 331. As known to those skilled in the art, the option ROM 331 of an add-in card 330 contains program code executable by the CPU 302, such as a firmware driver that is used to connect the device to the system once the option ROM 331 is loaded.

The PCH 310 can also provide one or more interfaces for connecting mass storage devices to the computer 300. For instance, according to an configuration, the PCH 310 includes a serial advanced technology attachment ("SATA") adapter for providing one or more SATA ports 320 and an ATA100 adapter for providing one or more ATA100 ports 322. The SATA ports 320 and the ATA100 ports 322 can be, in turn, connected to one or more mass storage devices (not shown in FIG. 3) storing an OS and application programs. As known to those skilled in the art, an OS comprises a set of programs that control operations of a computer and allocation of resources. An application program is software that runs on top of the OS and uses computer resources made available through the OS to perform application-specific tasks.

The mass storage devices connected to the PCH 310 and the SCSI host bus adapter 330, and their associated computer-readable storage media, can provide non-volatile storage for the computer 300. In addition to these mass storage devices, the computer 300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 300.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Encoding the program modules can also transform the physical structure of the storage media. The specific transformation of physical structure can depend on various factors in different implementations of the disclosed technologies. Examples of such factors can include, but are not limited to: the technology used to implement the storage media; whether the storage media are characterized as primary or secondary storage; and the like. For example, if the storage media are implemented as semiconductor-based memory, the program modules can transform the physical state of a semiconductor memory when the software or firmware is encoded therein. In one particular example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

It should be appreciated that the program modules disclosed herein can include software instructions that, when loaded into the CPU 302 and executed, transform a general-purpose computing system into a special-purpose computing system customized to facilitate all, or part of, the operations disclosed herein. As detailed throughout this description, the program modules can provide various tools or techniques by which the computer 300 can participate within the overall systems or operating environments using the components, logic flows, and/or data structures discussed herein.

As also shown in FIG. 3, a low pin count ("LPC") interface can also be provided by the PCH 310 for connecting a "Super I/O" device 338. The Super I/O device 338 is responsible for providing a number of I/O ports, including, but not limited to, a keyboard port, a mouse port, a serial interface, a parallel port, and other types of I/O ports. The LPC interface can also connect a firmware device such as a ROM, EPROM, or a flash memory such as a non-volatile random access memory ("NVRAM") for storing the firmware 124 that includes program code containing the routines that help to start up the computer 300 and to transfer information between elements within the computer 300. As discussed above, in one configuration the firmware 124 is a firmware that is compliant with the UEFI Specification.

The LPC interface can also be utilized to connect a NVRAM 337 to the computer 300. The NVRAM 337 can be utilized by the firmware 124 to store configuration data for the computer 300. The configuration data for the computer 300 can also be stored on the same device as the firmware 124 in some configurations.

The computer 300 can be implemented as an embedded control computer, a laptop, a server computer, a mobile device, a set-top box, a kiosk, a tablet or slate computing device, a vehicular information system, a mobile telephone, a customized machine, or other hardware platform. The CPU 302 can be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

The CPU 302 can be constructed from transistors and/or other circuit elements, which can individually or collectively assume any number of states. More specifically, the CPU 302 can operate as a state machine or finite-state machine. Such a machine can be transformed to a second machine, or a specific machine, by loading executable instructions contained within the program modules (e.g. the modules making up the firmware 124). These computer-executable instructions can transform the CPU 302 by specifying how the CPU 302 transitions between states, thereby transforming the transistors or other circuit elements constituting the CPU 302 from a first machine to a second machine, wherein the second machine can be specifically configured to perform the operations disclosed herein. The states of either machine can also be transformed by receiving input from one or more user input devices, network interfaces, other peripherals, other interfaces, or one or more users or other actors. Either machine can also transform states, or various physical characteristics of various output devices such as printers, speakers, video displays, or otherwise.

It should be appreciated that the various technologies disclosed herein can be implemented within other types of computing devices, including hand-held computers, embedded computer systems, smartphones, tablet or slate computing devices, personal digital assistants, or another type of computing device. It is also contemplated that the computer 300 might not include all of the components shown in FIG. 3, can include other components that are not explicitly shown in FIG. 3, or can utilize an architecture completely different than that shown in FIG. 3.

Referring now to FIG. 4, a software architecture diagram will be described that illustrates aspects of an interface between a firmware 124, such as a UEFI-compliant firmware, and an operating system 402 according to one or more configurations presented herein. As described above, a firmware 124 can include a UEFI-compliant firmware that is compliant with the UEFI Specification. The term "UEFI Specification" as used herein refers to both the EFI Specification developed by INTEL CORPORATION and the UEFI Specification managed by the UEFI FORUM.

The UEFI Specification describes an interface between the operating system 402 and the firmware 124. The UEFI Specification also defines an interface that the firmware 124 can implement, and an interface that the operating system 402 can use while booting. How the firmware 124 implements the interface can be left up to the manufacturer of the firmware. The UEFI Specification also defines a way for the operating system 402 and firmware 124 to exchange information necessary to support the operating system boot process.

According to some configurations, both a UEFI-compliant firmware 124 and a legacy BIOS support module 408 can be present. This allows the computer 300 to support a UEFI firmware interface and a legacy BIOS firmware interface. In order to provide this functionality, an interface 412 can be provided for use by legacy operating systems and applications. According to other configurations, only one of the UEFI-compliant firmware 124 and the legacy BIOS support module 408 are present in the firmware. According to yet other configurations, the firmware 124 can interface with the platform hardware 410 through any of various other architectures, components, or modules for the firmware without specific involvement of the UEFI-compliant firmware or the legacy BIOS support module 408. Additional details regarding the operation and architecture of a UEFI Specification-compliant firmware can be found in the UEFI Specification.

Turning now to FIG. 5, a block diagram will be described that illustrates an architecture for a UEFI Specification-compliant firmware that provides an operating environment for one or more configurations presented herein. As shown in FIG. 5, the architecture can include platform hardware 516 and an operating system 502. The firmware 124 can retrieve an operating system ("OS" or "O/S") image from the UEFI system partition 518 using a UEFI operating system loader 503. The UEFI system partition 518 can be an architecturally shareable system partition that provides a file system designed to support safe sharing of mass storage between multiple vendors. An OS partition 520 can also be utilized. The UEFI Specification defines the structure of the UEFI system partition 518.

Once started, the UEFI OS loader 503 can continue to boot the complete operating system 502. In doing so, the UEFI OS loader 503 can use UEFI boot services 504 and interface to other supported specifications to survey, comprehend, and initialize the various platform components and the operating system software that manages them. Thus, interfaces 514 from other specifications can also be present on the system. For example, the Advanced Configuration and Power Management Interface ("ACPI") and the System Management BIOS ("SMBIOS") specifications can be supported.

UEFI boot services 504 can provide interfaces for devices and system functionality used during boot time. UEFI runtime services 506 can also be available to the UEFI OS loader 503 during the boot phase. For example, a set of run time services can be presented that support variables, time/date, capsule, reset, and the like. UEFI allows extension of platform firmware by loading UEFI driver and UEFI application images which, when loaded, have access to UEFI-defined runtime and boot services.

It should be appreciated that technologies have been disclosed herein for enabling graphical customization of a firmware-provided setup menu. It should also be appreciated that while the subject matter presented herein has been described primarily in the context of a pre-boot execution environment provided by a UEFI Specification-compliant firmware, it is to be understood that the configurations disclosed herein are not limited to use with a UEFI Specification-compliant firmware. Similar configurations can be utilized in other pre-boot firmware execution environments, such as that provided by a firmware compliant with the OPEN FIRMWARE specification or another type of open or proprietary firmware.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example configurations illustrated and described, and without departing from the true spirit and scope of the present invention, which is set forth in the following claims.

The invention claimed is:

1. A non-transitory computer-readable storage medium having computer-executable instructions stored thereupon which, when executed by a computer, cause the computer to:
   convert first setup data to extensible markup language (XML) setup data during build time of a firmware, the first setup data defining one or more forms for a user interface (UI) provided by the firmware;
   provide the XML setup data to a setup UI pages customization application configured to provide a graphical UI (GUI) for defining a modified setup UI for the firmware, the XML setup data being provided during build time of the firmware;
   receive customized XML setup data from the setup UI pages customization application during build time of the firmware, the customized XML setup data defining the modified setup UI for the firmware; and
   create second setup data from the customized XML setup data during build time of the firmware, the second setup data configured for use by a setup browser executing in the firmware to render the modified setup UI at run time.

2. The non-transitory computer-readable storage medium of claim 1, wherein the first setup data comprises internal forms representation (IFR) setup data, and wherein the IFR setup data is compiled from visual forms representation (VFR) setup data defining the setup UI for the firmware.

3. The non-transitory computer-readable storage medium of claim 1, wherein the XML setup data and the customized XML setup data comprise XML identifying a platform-specific identifier, the one or more forms, controls to be placed on the one or more forms, language-specific strings, and one or more variables.

4. The non-transitory computer-readable storage medium of claim 1, wherein the one or more forms comprise one or more UI controls, and wherein the setup UI pages customization application is further configured to validate the UI controls based upon an offset associated with the UI controls, a length of the UI controls, and hash values associated with the UI controls.

5. The non-transitory computer-readable storage medium of claim 1, having further computer-executable instructions stored thereupon which, when executed by the computer, cause the computer to store the second setup data in a firmware device for use by the setup browser executing in the firmware to render the modified setup UI.

6. The non-transitory computer-readable storage medium of claim 1, wherein the graphical UI enables editing of the one or more forms for the UI provided by the firmware, the creation of new forms, and modification of controls on the one or more forms for the UI provided by the firmware and the new forms.

7. The non-transitory computer-readable storage medium of claim 1, wherein the second setup data is created based, at least in part, on the first setup data.

8. A system comprising:
   one or more central processing units (CPUs); and
   a firmware device storing instructions which, when executed by the one or more CPUs, cause the one or more CPUs to:
      convert first setup data to extensible markup language (XML) setup data during build time of a firmware, the first setup data defining one or more forms for a user interface (UI) provided by the firmware;
      provide the XML setup data to a setup UI pages customization application configured to provide a graphical UI (GUI) for defining a modified setup UI for the firmware, the XML setup data being provided during build time of the firmware;
      receive customized XML setup data from the setup UI pages customization application during build time of the firmware, the customized XML setup data defining the modified setup UI for the firmware; and
      create second setup data from the customized XML setup data during build time of the firmware, the second setup data configured for use by a setup browser executing in the firmware to render the modified setup UI at run time.

9. The system of claim 8, wherein the first setup data comprises internal forms representation (IFR) setup data, and wherein the IFR setup data is compiled from visual forms representation (VFR) setup data defining the setup UI for the firmware.

10. The system of claim 8, wherein the graphical UI enables creation of new forms and editing of the forms for the UI provided by the firmware.

11. The system of claim 8, wherein the XML setup data and the customized XML setup data comprise XML identifying a platform-specific identifier, the one or more forms, controls to be placed on the one or more forms, language-specific strings, and one or more variables.

12. The system of claim 8, wherein the one or more forms comprise one or more UI controls, and wherein the setup UI pages customization application is further configured to validate the UI controls based upon an offset, a length of the UI controls, and hash values associated with the UI controls.

13. The system of claim 8, wherein the firmware device stores further instructions which, when executed by the one or more CPUs, cause the one or more CPUs to store the second setup data in the firmware device for use by the setup browser executing in the firmware to render the modified setup UI.

14. A computer-implemented method, comprising:
   converting first setup data to markup language setup data during build time of a firmware, the first setup data defining one or more forms for a user interface (UI) provided by the firmware;
   providing the markup language setup data to a setup UI pages customization application configured to provide a graphical UI (GUI) for defining a modified setup UI for the firmware, the markup language setup data being provided during build time of the firmware;
   receiving customized markup language setup data from the setup UI pages customization application during build time of the firmware, the customized markup language setup data defining the modified setup UI for the firmware; and
   creating second setup data from the customized markup language setup data during build time of the firmware, the setup data consumable by a setup browser executing in the firmware to render the modified setup UI at run time.

15. The computer-implemented method of claim 14, wherein the first setup data comprises internal forms representation (IFR) setup data, and wherein the IFR setup data is compiled from visual forms representation (VFR) setup data defining the setup UI for the firmware.

16. The computer-implemented method of claim 14, wherein the markup language setup data and the customized markup language setup data comprise markup language identifying a platform-specific identifier, the one or more forms, controls to be placed on the one or more forms, language-specific strings, and one or more variables.

17. The computer-implemented method of claim 14, wherein the one or more forms comprise one or more UI controls, and wherein the setup UI pages customization application is further configured to validate the UI controls based upon an offset, a length of the UI controls, and hash values associated with the UI controls.

18. The computer-implemented method of claim 14, further comprising storing the second setup data in a firmware device for use by the setup browser executing in the firmware to render the modified setup UI.

19. The computer-implemented method of claim 14, wherein the graphical UI enables the creation of new forms and editing of the one or more forms for the UI provided by the firmware.

20. The computer-implemented method of claim 19, wherein the graphical UI further enables modification of controls on the one or more forms for the UI provided by the firmware and the new forms.

* * * * *

UNITED STATES PATENT AND TRADEMARK OFFICE
CERTIFICATE OF CORRECTION

PATENT NO. : 10,540,151 B1
APPLICATION NO. : 15/663500
DATED : January 21, 2020
INVENTOR(S) : Stefano Righi et al.

Page 1 of 1

It is certified that error appears in the above-identified patent and that said Letters Patent is hereby corrected as shown below:

On the Title Page

Item (73) Assignee: delete "American Medatrends International, LLC" and insert therefore
--American Megatrends International, LLC--

Signed and Sealed this
Fourteenth Day of July, 2020

Andrei Iancu
*Director of the United States Patent and Trademark Office*